United States Patent [19]

Griffin

[11] Patent Number: 5,109,327
[45] Date of Patent: Apr. 28, 1992

[54] ELECTRONIC SYSTEM AND METHOD FOR SUPPLYING POWER TO SINGLE-PHASE LOADS USING A THREE-PHASE POWER SUPPLY

[76] Inventor: Anthony J. Griffin, 13 Bungalow Road, Peakhurst, New South Wales, 2210, Australia

[21] Appl. No.: 595,541

[22] Filed: Oct. 11, 1990

[51] Int. Cl.$^5$ .............................................. H02M 5/00
[52] U.S. Cl. ....................................... 363/36; 363/37; 363/2
[58] Field of Search ................. 363/3, 4, 36, 37, 148, 363/149, 2, 153, 154; 307/46, 48, 66

[56] References Cited

U.S. PATENT DOCUMENTS

| | | | |
|---|---|---|---|
| 3,202,896 | 8/1965 | Lewus | 318/768 |
| 4,638,418 | 1/1987 | Alexander | 363/49 |
| 4,985,819 | 1/1991 | Mori et al. | 363/37 |

*Primary Examiner*—Peter S. Wong
*Attorney, Agent, or Firm*—Hopgood, Calimafde, Kalil, Blaustein & Judlowe

[57] ABSTRACT

An electronic system comprises a three-phase transformer, a power conversion circuit, and a control circuit. The three-phase transformer has primary windings and first, second and third secondary windings. The primary windings are connected to three-phase power supply and the first secondary winding is connected in phase with a single-phase load, such as an electric railway. The second and third secondary windings are connected to the single-phase load by the power conversion circuit. The power conversion circuit includes an a.c. to d.c. converter, a d.c. to a.c. converter, and a single-phase transformer. The d.c. to a.c. converter is adapted to convert out of phase power from the second and third windings, into a d.c. voltage signal. The d.c. to a.c. converter is connected to a.c. to d.c. converter and is adapted to convert the d.c. voltage signal into a single-phase a.c. voltage signal. The single-phase transformer has a primary winding which is connected to the d.c. to a.c. converter, and a second winding which is connected to the single-phase load. The control circuit is operably associated with the power conversion for controlling the a.c. to d.c. converter and the d.c. to a.c. converter, so that the single-phase load appears as a balanced three-phase load on the three-phase power supply.

10 Claims, 1 Drawing Sheet

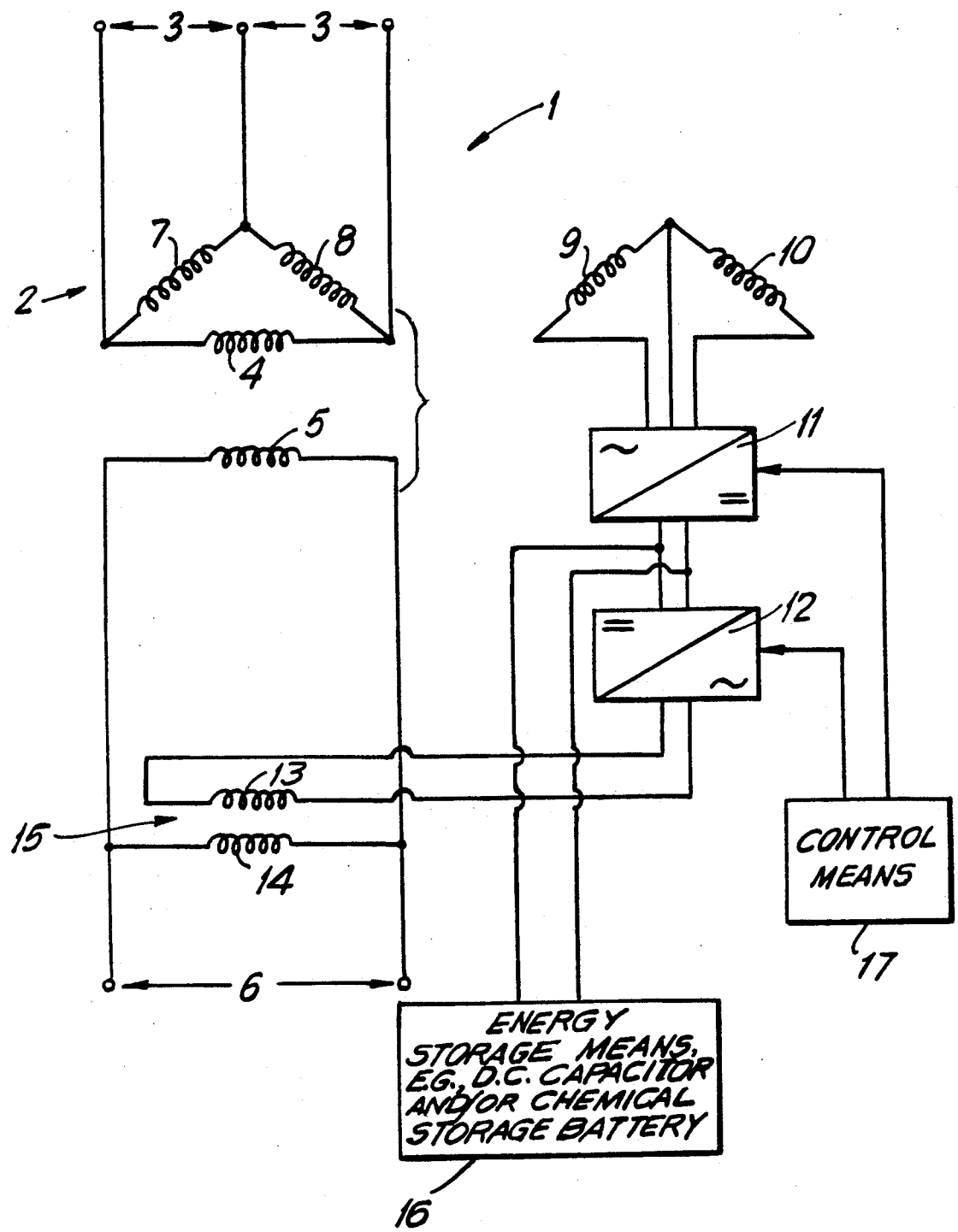

ELECTRONIC SYSTEM AND METHOD FOR SUPPLYING POWER TO SINGLE-PHASE LOADS USING A THREE-PHASE POWER SUPPLY

The present invention relates to an electronic three-phase to single-phase power converter, and, in particular to a power converter for supplying power to a single-phase load when only a three-phase supply is available. The converter of the present invention is particularly applicable when load conditions are liable to fluctuate to a relatively large extent, the device of the present invention providing regulation by conversion of the three-phase power to a d.c. voltage enabling storage of excess energy during low load levels.

The present invention is particularly applicable to electric railways wherein loads fluctuate as trains move over the railway on constantly changing grades, as they slow for speed restrictions and crossings with other trains, as they slow or stop for signals and as they accelerate after slowing or stopping.

The present invention is intended to be utilised particularly in applications wherein the load is a single-phase a.c. load of standard industrial frequency, for example 50 Hz in Australia, but, due to local limitations of power supplies, the load must appear to the power supply as a near balanced three-phase load.

The present invention seeks to provide a voltage conversion and supply device and method whereby a three-phase supply can be converted into a single-phase power source for provision to a single-phase load.

The present invention also seeks to provide a method and device for converting and storing power, such that, in low load power levels, excess energy supplied by the power supply may be stored for later use thereof.

In one broad form the present invention provides an electronic three-phase to single-phase power converter, comprising:

a three-phase transformer, the primary windings thereof being connected to a three-phase power supply;

a first secondary winding having a single-phase load connected in phase therewith;

a second and a third secondary winding being connected via a power conversion means to said single-phase load;

said power conversion means comprising:

an a.c. to d.c. converter, adapted to convert the out of phase power of said second and third secondary windings into a d.c. voltage signal;

a d.c. to a.c. converter connected to said a.c. to d.c. converter, adapted to convert said d.c. voltage signal to a single-phase a.c. voltage signal; and, a single-phase transformer, a primary winding thereof connected to said d.c. to a.c. converter, and a second winding thereof connected to said single-phase load.

In a further broad form, the present invention provides a method of converting three-phase power into single-phase power, comprising the steps of:

supplying a first phase of three-phase power supply via a first secondary winding of a three-phase transformer directly to a load;

supplying a second and a third phase of said three-phase power supply from a second and a third secondary winding of said three-phase transformer, via an a.c. to d.c. converter, a d.c. to a.c. converter and a single-phase transformer to said load.

In a preferred embodiment of the present invention, the electronic three-phase to single-phase power converter and/or method is embodied wherein an energy storage means is provided such that, in periods of low load power, excess energy supplied by said three-phase power supply is stored in said storage means, and, in periods of high load power, the excess energy stored by said storage means is adapted to supplement the energy of said three-phase power supply.

Preferably, the energy storage means is a d.c. capacitor and/or a chemical storage battery.

Also, preferably, the electronic three-phase to single-phase power converter and/or method, is adapted to an electric railway.

The present invention will become more fully understood from the following detailed description thereof, in connection with the accompanying drawing, wherein a preferred embodiment of the present invention is illustrated.

The drawing shows an electronic three phase to single phase converter, generally designated by the numeral 1. The primary windings 2 of a three-phase transformer, are connected to a three-phase supply 3. Coupled to a first of the primary windings 4 is a first secondary winding 5, which is connected directly across a single-phase load, such as an a.c. railway system 6. The second and third primary windings, 7 and 8, are electrically and magnetically connected to the second and third secondary windings 9 and 10, respectively. An a.c. to d.c. converter 11 is connected to the secondary windings 9 and 10 of the three-phase transformer, and the output of the a.c. to d.c. converter 11 is connected to a d.c. to a.c. converter 12. The output of the d.c. to a.c. converter 12 is connected to the primary winding 13 of a single-phase transformer 15, the secondary winding 14 of the single phase transformer 15 being connected to the load 6.

Optionally, an energy storage means 16 is connected between the a.c. to d.c. converter 11 and the d.c. to a.c. converter 12. The converter 11 and 12 are controlled by control buses 17.

In operation, during periods of light load and no load, the majority of the single-phase load current is taken via the secondary winding 5 of the three-phase transformer directly into the load 6. During periods of heavy load, the single-phase load 6 is supplied partly by the in phase winding 5 of the three-phase transformer, and partly be the secondary winding 14 of the single-phase transformer.

Energy is supplied to the primary winding 13 of the single-phase transformer 15 as described hereinafter. The secondary windings 9 and 10 of the three phase transformer cooperate electrically and magnetically with the primary windings 7 and 8 respectively. Power supplied to the windings 9 and 10 are converted by means of an a.c. to d.c. converter 11 to a d.c. voltage supplied on a d.c. busbar at the output of the a.c. to d.c. converter 11. The d.c. voltage is then converted via a d.c. to a.c. converter 12 into a single-phase a.c. voltage, which is then supplied to the primary winding 13 of the single-phase supply 15. Optionally, an energy storage means 16 may be connected between the a.c. to d.c. converter 11 and the d.c. to a.c. converter 12, such that, during periods of low load, excess energy supplied by the windings 9 and 10 of the three phase transformer may be converted by the a.c. to d.c. converter 11 into a d.c. voltage for storage in the energy storage means 16. The energy storage means 16 may be embodied as either a d.c. capacitor or a battery, or any other suitable storage means. During periods of high load, the excess energy stored in the energy storage means 16 may be converted by the d.c. to a.c. converter 12, and supplied via the winding 13 and 14 of the single phase converter 15 to supplement the load 6.

To control the operation of the a.c. to d.c. converter 11 and the d.c. to a.c. converter 12, the converters may be supplied with a control input 17. The control may be arranged in a plurality of ways, for example, by the control of the negative sequence voltages at the point of installation, by the control of the negative sequence currents at some remote point in the three phase system, by the control of the power factor of the single phase load as it appears to the three phase system, or by the voltage regulation of the single phase load at the output terminals of the device.

The present invention therefore provides a three phase to single phase power converter with an optional energy storage means. The device may be utilised to regenerate power as required as instantaneous load conditions vary. The load then at all times appears to the three phase supply as a balanced load.

The present has been hereindescribed with reference to a particular embodiment. It should be understood that this embodiment is described as a preferred embodiment only, and that numerous variations and modifications will be envisaged to the invention by persons skilled in the art. Such variations and modifications should be considered to fall within the scope of the present invention as hereindescribed.

I claim:

1. An electronic system for supplying power to a single-phase load using a three-phase power supply, said electronic system comprising:
   a three-phase transformer having primary windings and first, second and third secondary windings, said primary windings being connected to a three-phase power supply,
   said first secondary winding being connected in phase with a single-phase load,
   said second and third secondary windings being connected to said single-phase load by a power conversion means;
   said power conversion means including
   an a.c. to d.c. converter adapted to convert out of phase power from said second and third secondary windings into a d.c. voltage signal,
   a d.c. to a.c. converter operably connected to said a.c. to d.c. converter, and being adapted to convert said d.c. voltage signal into a single-phase a.c. voltage signal, and
   a single-phase transformer having a primary winding and a second winding, said primary winding being connected to said d.c. to a.c. converter, and said second winding being connected to said single-phase load; and
   control means operably associated with said power conversion means for controlling the operation of said a.c. to d.c. converter and said d.c. to a.c. converter so that said single-phase load appears as a balanced three-phase load on said three-phase power supply.

2. The electronic system as claimed in claim 1, which further comprises energy storage means for storing during periods of low load, excess energy supplied by said three-phase power supply, and, during periods of high load power, for releasing the excess energy stored by said energy storage means to supplement the energy of said three-phase power supply.

3. The electronic system as claimed in claim 2, wherein said energy storage means is a d.c. capacitor and/or a chemical storage battery.

4. The electronic system as claimed in claim 1, which further comprises energy storage means for storing during periods of low load, excess energy supplied by said three-phase power supply, and during periods of high load power, for releasing the excess energy stored by said energy storage means to supplement the energy of said three-phase power supply.

5. The electronic system as claimed in claim 1, wherein said single-phase load is provided by an electric railway.

6. An electronic system for supplying power to a single-phase electric railway load using a three-phase power supply, said electronic system comprising:
   a three-phase transformer having primary windings and first, second and third secondary windings, said primary windings being connected to a three-phase power supply,
   said first secondary winding being connected in phase with a single-phase electric railway load,
   said second and third secondary windings being connected to said single-phase electric railway load by a power conversion means;
   said power conversion means including
   an a.c. to d.c. converter adapted to convert out of phase power from said second and third secondary windings into a d.c. voltage signal,
   a d.c. to a.c. converter operably connected to said a.c. to d.c. converter, and being adapted to convert said d.c. voltage signal into a single-phase a.c. voltage signal, and
   a single-phase transformer having a primary winding and a second winding, said primary winding being connected to said d.c. to a.c. converter, and said second winding being connected to said single-phase electric railway load; and
   control means operably associated with said power conversion means for controlling the operation of said a.c. to d.c. converter and said d.c. to a.c. converter so that said single-phase electric railway load appears as a balanced three-phase load on said three-phase power supply.

7. A method of converting three phase power into single phase power, comprising the steps of:
   (a) supplying a first phase of a three phase power supply via a first secondary winding of a three-phase transformer directly to a single-phase load;
   (b) supplying a second and third phases of said three-phase power supply from second and third secondary windings of said three-phase transformer, via an a.c. to d.c. converter, a d.c. to a.c. converter and a single-phase transformer to said single-phase load.

8. The method as claimed in claim 7, which further comprises storing excess energy in an energy storage means provided between said a.c. to d.c. converter, so that, during periods of low load, excess energy supplied by said three phase power supply is stored in said energy storage means, and, during periods of high load power, the excess energy stored by said storage means is released to supplement the energy of said three phase power supply.

9. The method as claimed in claim 8, wherein said energy storage means is a d.c. capacitor and/or a chemical storage battery.

10. The method as claimed in claim 7, wherein step (b) comprises controlling the operation of said a.c. to d.c. converter and said d.c. to a.c. converter by one or more of
   (i) controlling negative sequence voltages at said three phase power supply, and
   (ii) controlling the power factor of said load as it appears to said three phase power supply.

* * * * *

UNITED STATES PATENT AND TRADEMARK OFFICE
CERTIFICATE OF CORRECTION

PATENT NO. : 5,109,327
DATED : April 28, 1992
INVENTOR(S) : Anthony Griffin It is certified that error appears in the above-identified patent and that said Letters Patent is hereby corrected as shown below:

Claim 4, column 4, line 6, change "claim 1" to claim --6--.

Signed and Sealed this

Sixth Day of July, 1993

Attest:

MICHAEL K. KIRK

*Attesting Officer*   Acting Commissioner of Patents and Trademarks